April 25, 1933. J. F. GAIL 1,905,459
SPRING ASSEMBLING MACHINE
Original Filed Nov. 18, 1929 10 Sheets-Sheet 6

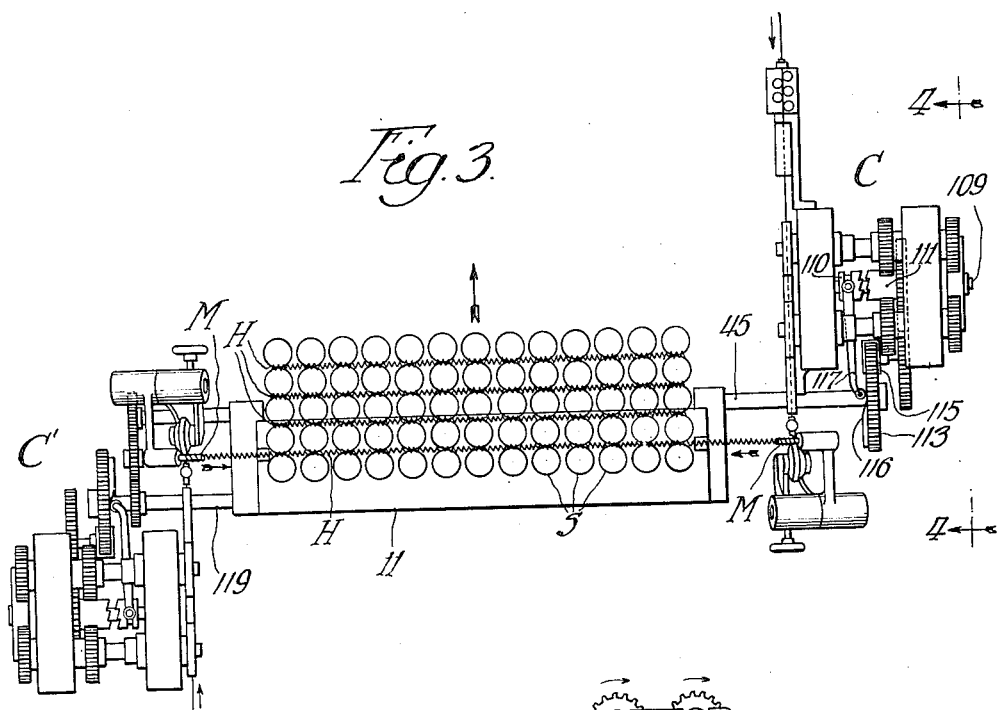
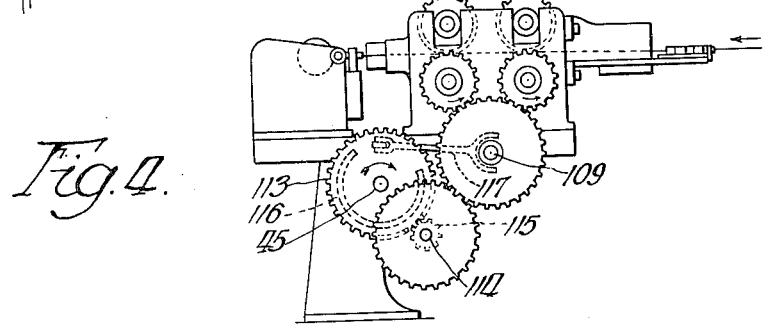
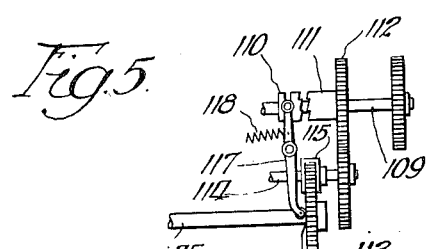

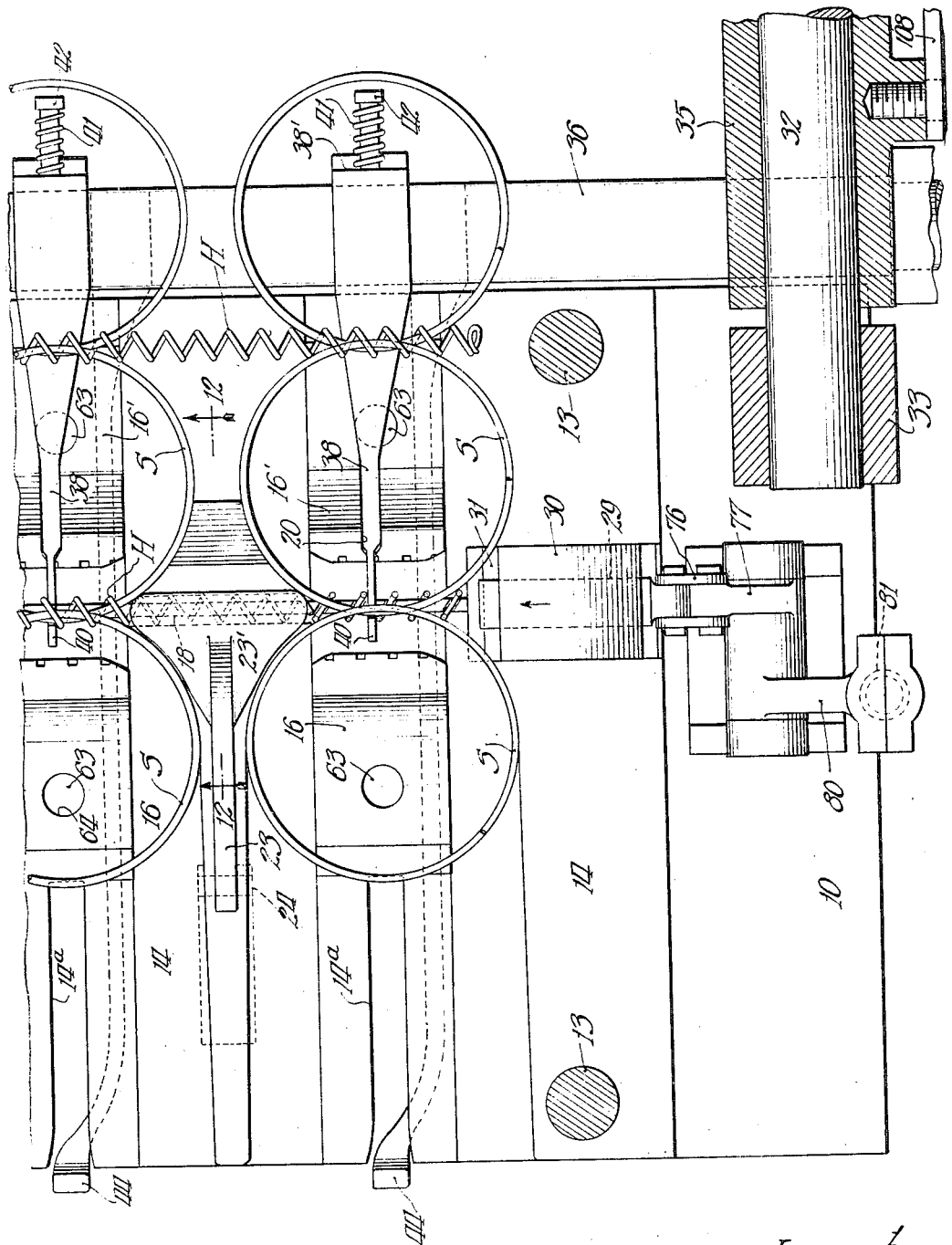

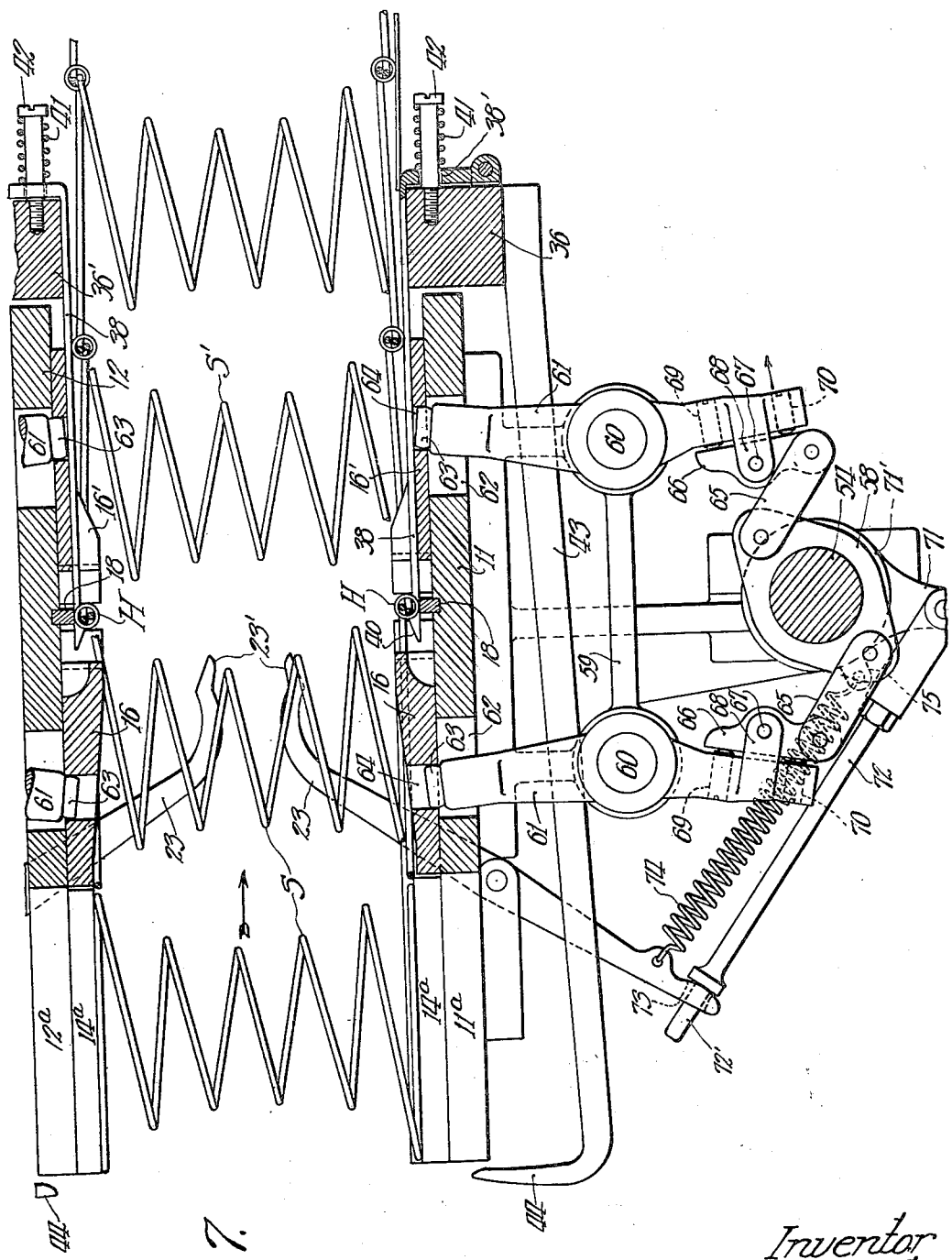

Inventor
John F. Gail

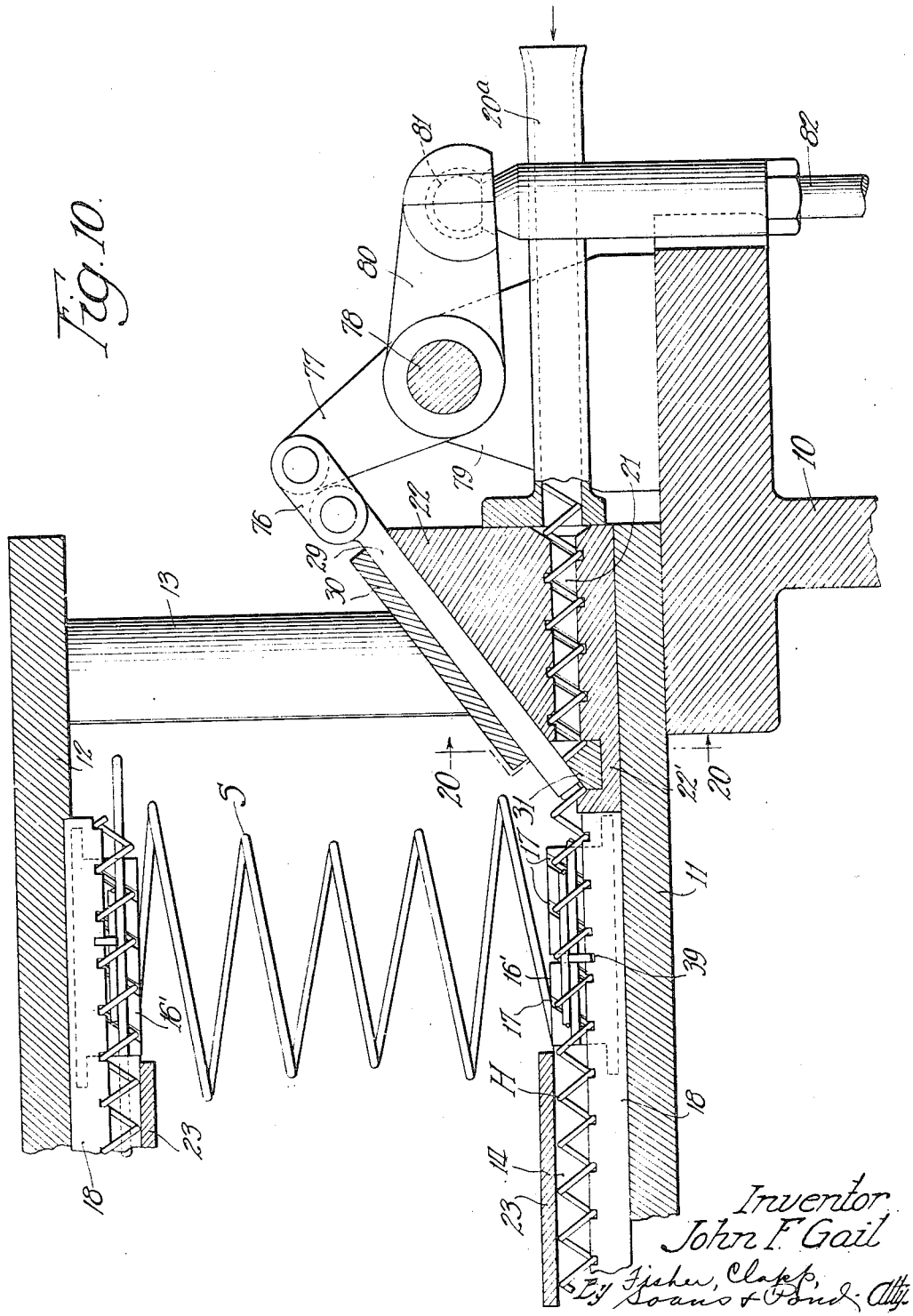

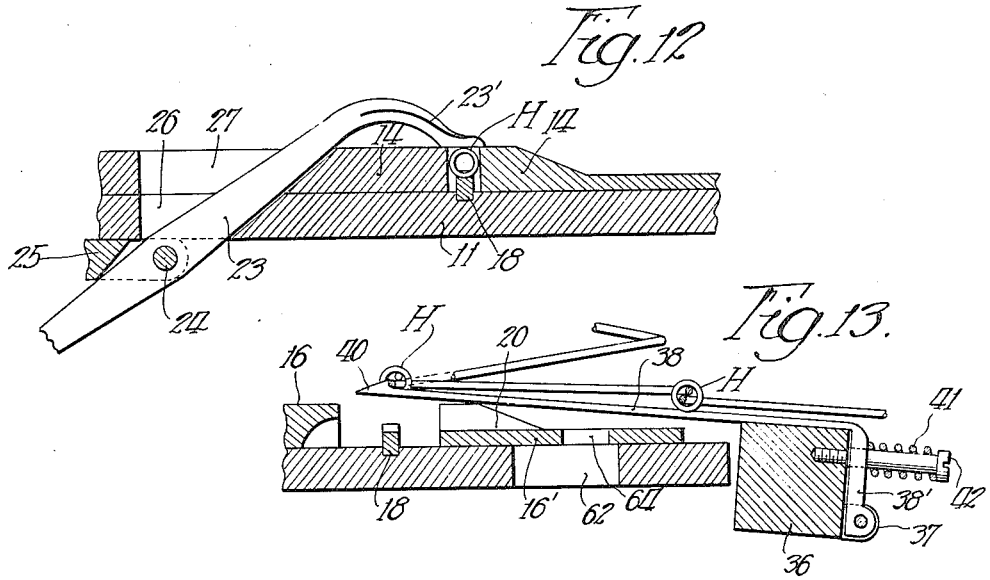
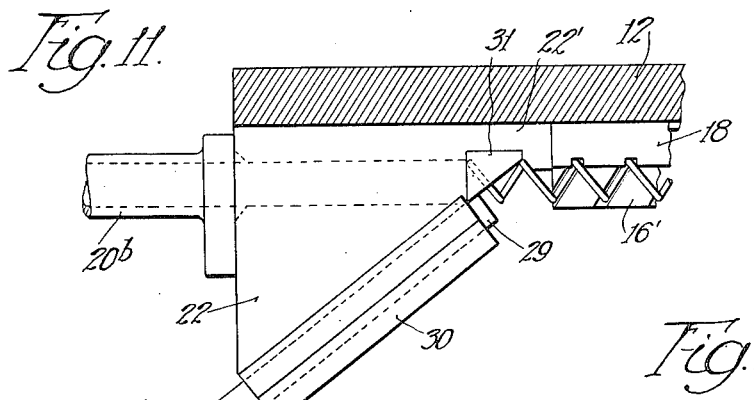
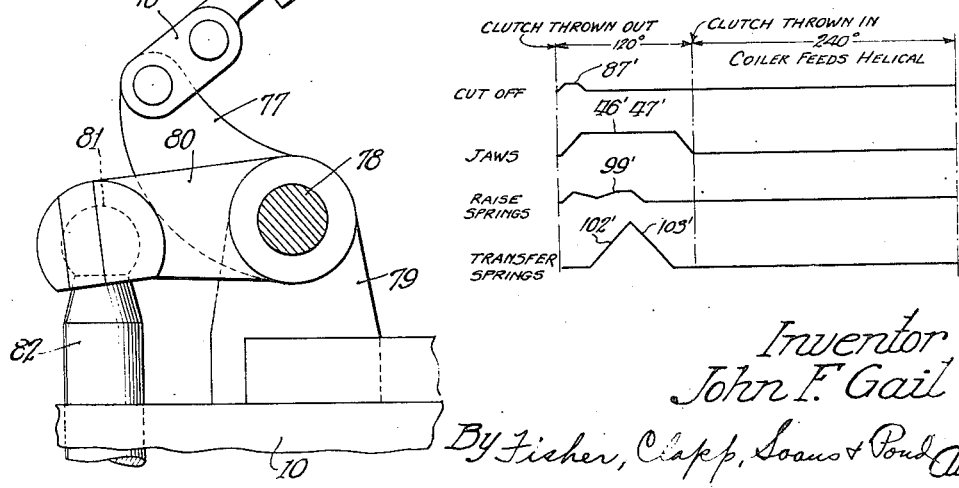

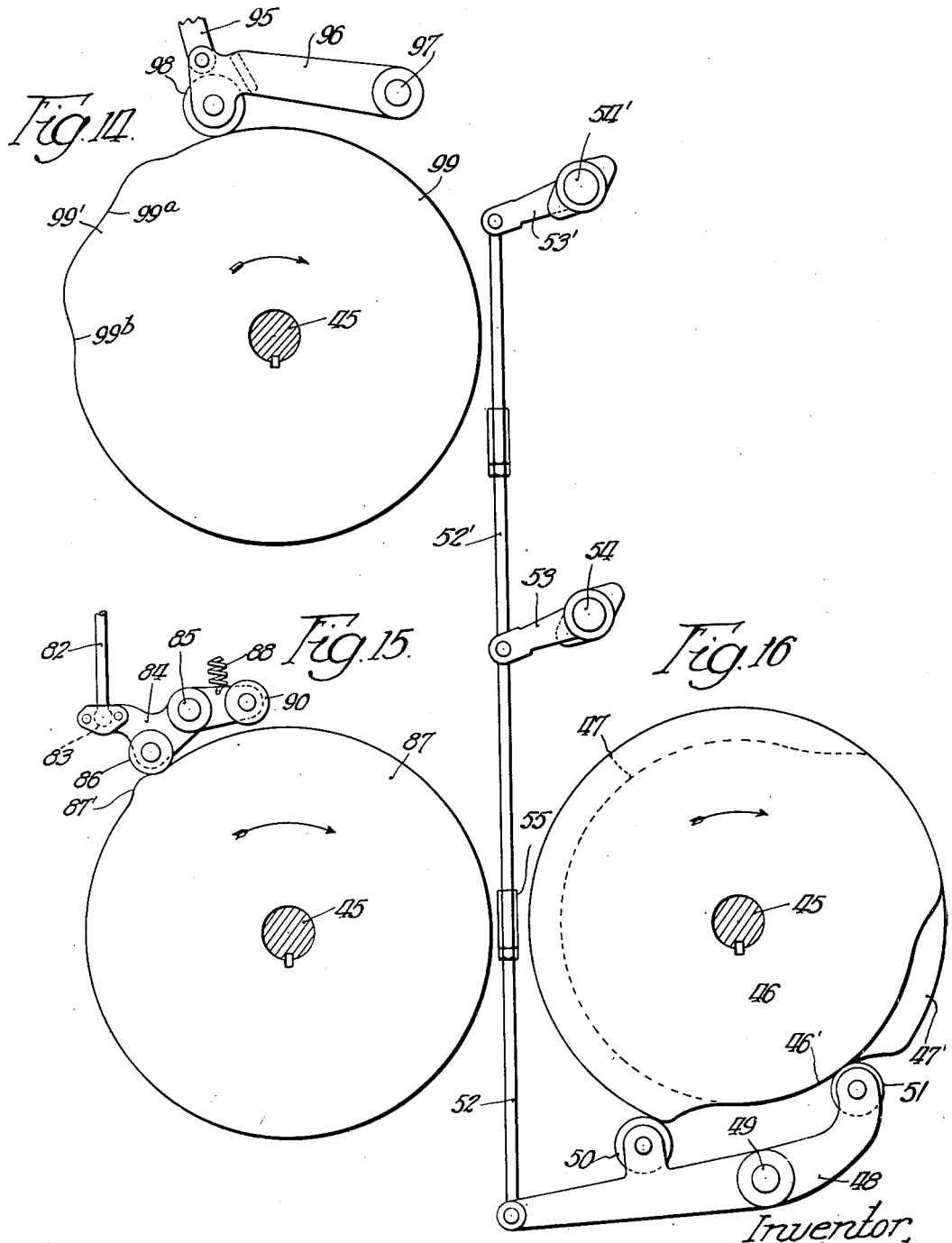

April 25, 1933.  J. F. GAIL  1,905,459
SPRING ASSEMBLING MACHINE
Original Filed Nov. 18, 1929   10 Sheets—Sheet 10
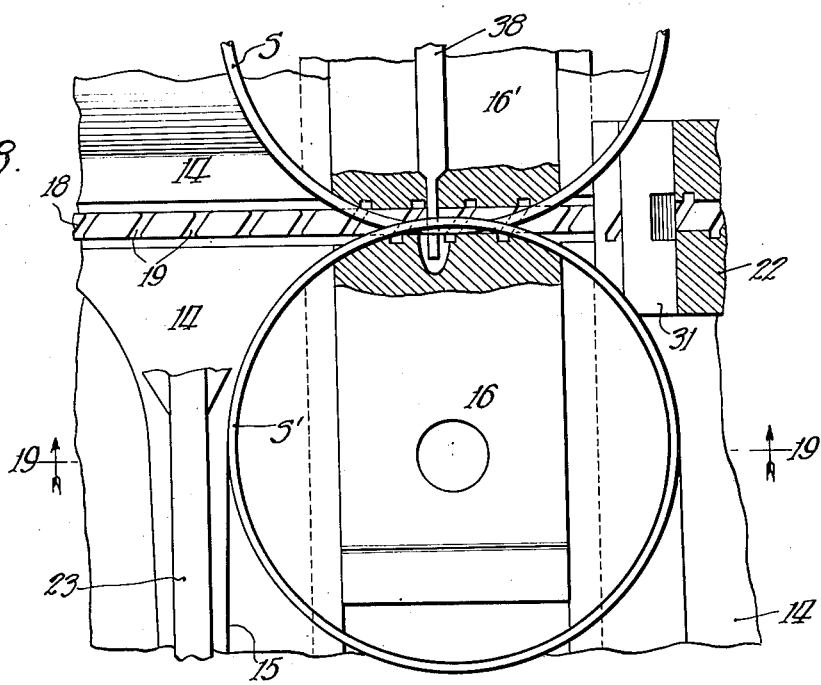
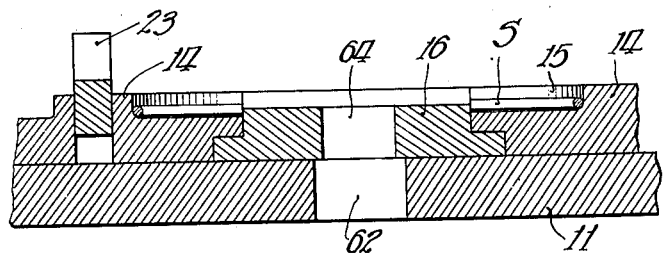
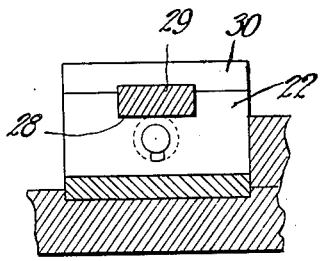
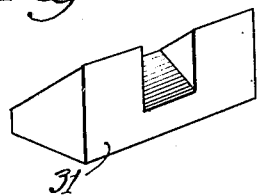
Inventor
John F. Gail Patented Apr. 25, 1933

1,905,459

UNITED STATES PATENT OFFICE

JOHN F. GAIL, OF EVANSTON, ILLINOIS, ASSIGNOR TO SIMMONS COMPANY, OF NEW YORK, N. Y., A CORPORATION OF DELAWARE

SPRING ASSEMBLING MACHINE

Application filed November 18, 1929, Serial No. 407,941. Renewed August 26, 1932.

This invention relates to machines for assembling and connecting coiled springs employed in the manufacture of bed springs, cushions, mattresses and the like.

In one known type of spring assembly, the upright spiral springs disposed in longitudinal and transverse rows are connected at their upper and lower ends by continuous wire helicals which extend between adjacent rows of springs and are threaded through and connected to adjacent coils at the top and bottom ends of the springs. Heretofore, so far as I am aware, these wire helical connecting members have been manually applied to the coil springs after the latter have been suitably positioned in longitudinal and transverse rows. This manual application of the wire helical tie members involves much time and labor; and the general object of the present invention has been to provide a machine, through the agency of which the wire helicals may be threaded through the end coils of adjacent rows of spiral springs, and the connected rows shifted sidewise and a succeeding row brought into proper position to be similarly united to the last attached row, and so on, thereby building up a continuous web of connected coil springs which may be subsequently divided into desired lengths for individual bed springs or mattresses. Another object of the invention is to provide a machine of the character above indicated that may be employed in conjunction with one or more wire coiling machines which will form the wire helicals and at the same time feed the latter through the spring assembling machine, and to provide in conjunction therewith, one or more automatic cutters for severing the helicals after a proper length of the latter has been fed, and automatic means for arresting the action of the coilers while the springs are shifted to a position to receive another set of wire helicals for the attachment of another row of springs to the previously formed stock.

Still other objects and attendant advantages of the invention will be apparent to persons skilled in the art of spring assembling devices from the following detail description taken in connection with the accompanying drawings, in which I have illustrated one practical embodiment of the invention, and wherein—

Fig. 3 is a top plan assembly, showing associated coiling mechanisms, with the top plate and parts carried thereby omitted for the sake of clearness.

Fig. 4 is a side elevation of one of the coilers viewed on the line 4—4 of Fig. 3.

Fig. 5 is a detail view of an automatic clutch for throwing the coiler into and out of operation.

Fig. 6 is an enlarged fragmentary plan section on the line 6—6 of Fig. 2.

Fig. 7 is an enlarged fragmentary vertical section taken on the line 7—7 of Fig. 1, showing the coil guiding jaws and cover member in open position.

Fig. 10 is an enlarged fragmentary vertical section taken on the line 10—10 of Fig. 2, more particularly illustrating the lower coil cutting and crimping mechanism.

Fig. 11 is a view similar to Fig. 10, showing the upper coil cutting and crimping mechanism on the opposite side of the machine.

Fig. 12 is an enlarged detail vertical section on the line 12—12 of Fig. 6, showing one of the pivoted cover members in closed position.

Fig. 13 is a fragmentary vertical section corresponding to the lower right hand portion of Fig. 7, showing the stripping mechanism in raised position.

Fig. 14 is a detail view of the stripper cam and its follower.

Fig. 15 is a detail view of the coil cutoff cam and its follower.

Fig. 16 is a detail view of the jaw actuating cams, their followers and rock shafts actuated thereby.

Fig. 17 is a diagram illustrating in developed view, the several actuating cams and their time relation to each other and to the coil feeding mechanism.

Fig. 18 is a fragmentary plan view, partly in horizontal section, of the movable coil guiding jaws, and the fixed coil guiding strips, the former being shown in closed position.

Fig. 19 is a vertical section on the line 19—19 of Fig. 18.

Figure 20 is an enlarged vertical section through the coil cutter and crimper on the line 20—20 of Fig. 10.

Fig. 21 is a perspective detail of the cutter anvil block that appears in vertical cross section in Fig. 10.

Figure 1:
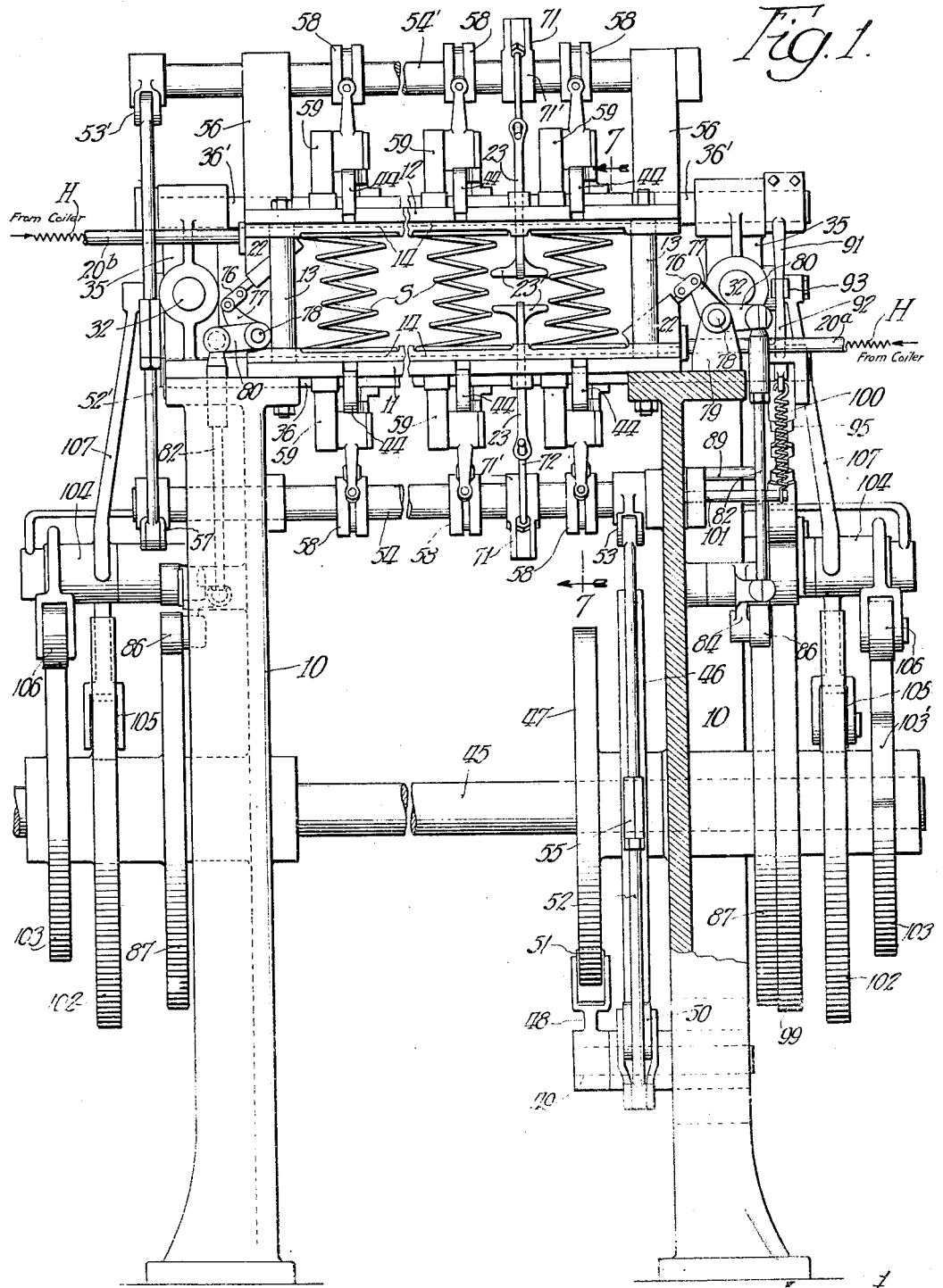
Fig. 1 is a front elevation of the machine in vertical section through part of one of the side frame members.

Referring first to the principal assembly views, Figs. 1, 2 and 3, 10 designates each of a pair of upright side frame members, on and between which rests the bottom plate 11 of a generally rectangular spring guiding and supporting structure which includes a top plate 12 similar to and parallel with the bottom plate 11, and four vertical spacing posts 13, which latter, as shown in Fig. 1, serve also to connect the spring supporting and guiding structure to the tops of the frames 10. In practice the rectangular superstructure is of sufficient length to accommodate the passage therethrough of successive rows of coil springs S, each row having a length equal to the width of the spring assembly to be formed. To reduce the illustration, the row which, in practice, would comprise 13 or more springs, is broken out as shown in Fig. 1.

The rows of springs S are successively entered either by hand or by suitable feed mechanism (not shown) at the left side of the spring supporting and guiding structure, viewing Fig. 2, and the rows are successively advanced and guided through the latter, and the top and bottom coils of adjacent rows united during such passage by wire helicals fed transversely of the path of travel of the rows, all as hereinafter more particularly described.

Figure 9:
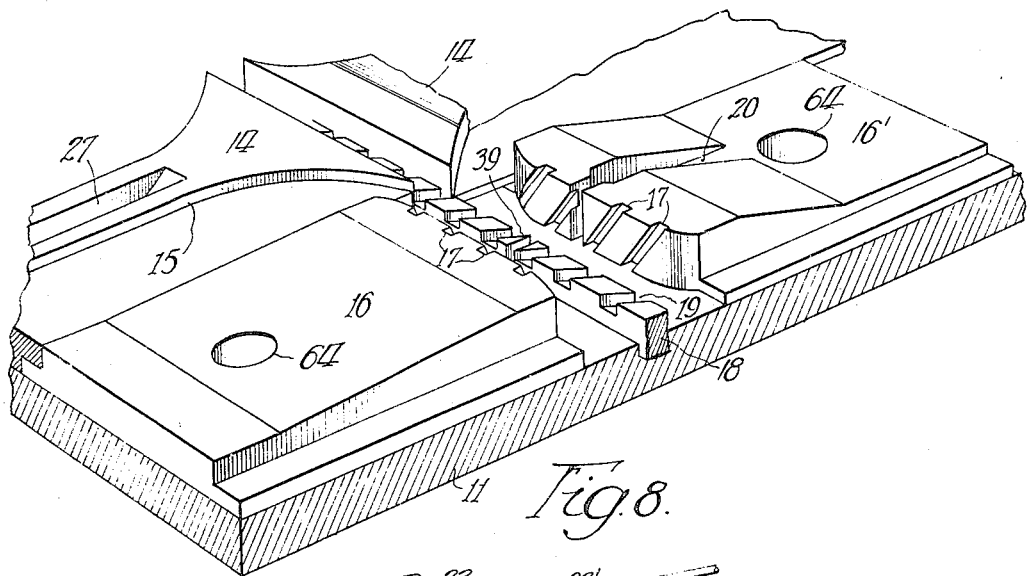
Fig. 9 is a perspective view of the coil guiding jaws and stationary guide strip, with the jaws in open position.
Figure 8:
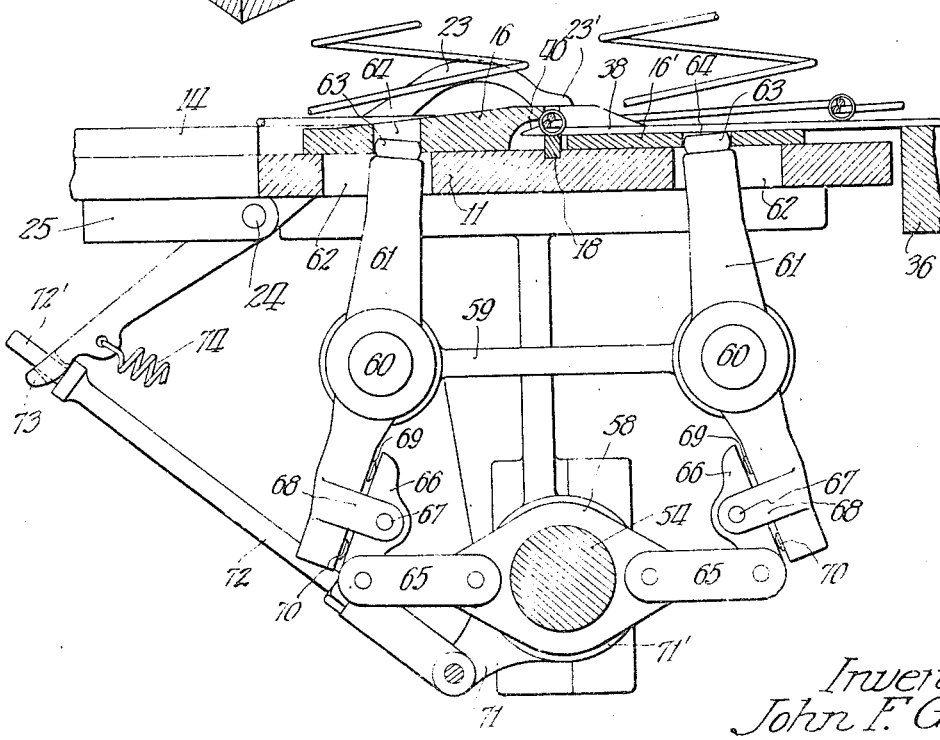
Fig. 8 is an enlarged fragmentary vertical section similar to the lower portion of Fig. 7, but showing the coil guiding jaws and cover member in closed position.

Attached to the bottom and top plates 11 and 12 are spaced guide strips 14, those on the entrance side of the machine being formed with shallow counter-sinks 15 (Figs. 18 and 19) of a width to seat and guide the lower coils of the springs. The guide strips 14 are under cut on their inner edges, as shown in Fig. 19, to form guideways for an opposed pair of sliding jaws 16 and 16'. As best shown in Fig. 9, the opposed inner ends of these jaws are formed with oblique grooves 17 constituting lateral guides for the wire helical as it is forced endwise between the jaws. Also mounted on the bottom plate 11 and extending between and crosswise of the jaws 16 and 16' is a fixed guide strip 18, the upper surface of which is likewise formed with oblique grooves 19 registering with the grooves 17 of the jaws and forms guides for the bottom portion of the wire helical. It will be observed from Fig. 9 that the top surface of the jaw 16 slopes gradually upwardly from its outer to its inner end while the top surface of the jaw 16' slopes somewhat abruptly downwardly from its inner end to approximately its mid-length, and the front corners of each jaw are rounded to have line engagement with the coil at a plurality of spaced points so as to force the coil to correct curvature. The jaw 16' is also formed with a longitudinal groove or channel 20 to accommodate a stripper device hereinafter described. As seen in Figs. 9 and 18, the opposed inner ends of the fixed guide strips 14, which lie between adjacent pairs of jaws, are plain, and the grooved strip 18 extends through and forms the bottom wall of the guide channel between the inner ends of the strips 14.

The guiding means last described for the springs and the wire helical connector is duplicated on the lower side of the top plate 12, and in the preferred arrangement herein illustrated the wire helical which connects the bottom coils of the springs is fed through the machine from one side of the latter, while the wire helical which unites the top coils of the springs is fed through from the opposite side of the machine, as clearly indicated in Figs. 1 and 3. In Fig. 3 I have illustrated in top plan view and somewhat diagrammatically a pair of wire coiling machines for making the wire helical, one of these machines being shown at the right and designated C, and the other at the left designated C'. No novelty is claimed for these coiling machines and consequently no detailed description thereof is necessary, it merely being noted that the wire is fed off in helical form from a mandrel M of the machine C and another wire is similarly fed off in the opposite direction from the mandrel M' of the coiler C'. The mandrel M is in alignment with a guide tube 20$^a$ attached to the right hand side of the machine (Fig. 1) and the mandrel M' is in alignment with a similar guide tube 20$^b$, on the left hand side of the machine (Fig. 1); the inner ends of these guide tubes 20$^a$ and 20$^b$ being in alignment with the helical guide channel formed between the jaws 16, 16', and the intermediate fixed guide strips 14. By reference to Fig. 10, it will be seen that each of the guide tubes 20$^a$ and 20$^b$ registers at its inner end with a spirally grooved duct 21 that is formed in a cutter guide block 22 mounted on the bottom and top plates 11 and 12.

As each wire helical is fed by its coiler through the introductory guide tube 20$^a$ or 20$^b$ and thence into the guide channel between the first pair of jaws 16, 16', it is advanced and encircles and winds around the tangent portions of corresponding end coils of two springs, locking them together. The wire helical then advances through the intermediate portion of the guide channel between guide strips 14, during which travel it tracks with the grooved guide strip 18. To prevent the advancing end of the helical springing upwardly out of its intended path, I provide in association with each pair of opposed stationary guide strips 14 a pivoted lid or cover member, which is best illustrated in Figs. 1, 6 and 12, and comprises a lever 23 pivoted at 24 to a lug 25 on the under side of the bottom plate 11 and a similar lever pivoted on the top side of the top plate 12. This lever extends upwardly through slots 26 in the bottom and top plates 11 and 12 and registering slots 27 in the guide strips 14, and said lever is formed with a generally fan-shaped upper end portion 23' that is curved toward the guide plates and flattened to form a closure for the guide channel between the guide plates.

The advancing ends of the wire helicals, which are indicated at H in the drawings, after passing through the guide channels between the first pairs of guide strips 14 travel between the next pairs of closed jaws 16 and 16', connecting the next springs of the two rows, thence through the next fixed guide channels, and so on through the entire length of the rows, as diagrammatically illustrated in Fig. 3, thus connecting all the springs of the two rows both top and bottom.

After each wire helical has thus been threaded between the springs of adjacent rows so as to connect said springs, it is automatically cut off and the end thereof meshed or crimped down to prevent accidental withdrawal by a cutter device mainly illustrated in Figs. 1, 10, 11, 20 and 21, Fig. 10 illustrating the lower cutter, and Fig. 11 the duplicate upper cutter, which is merely the lower cutter inverted. In the block 22 is an inclined channel 28 (Fig. 20) in which is slidably mounted a cutter bar 29, confined therein by a cover plate 30. The lower end of the cutter bar 29 has a shear relation to a notched anvil block 31 that is situated in a transverse channel formed in an inwardly projecting portion 22' of the block 22 (Fig. 10). As shown in Fig. 10, the wire helical H, as it advances, rides up the inclined bottom wall of the notch of the anvil block 31 and then downwardly over the other side of block, across which notch the cutter bar 29 descends at the proper time, severing the wire, and at the same time mashing or flattening down the severed end so as to form a sort of head which cannot be pulled through the springs.

After each pair of wire helicals has thus been assembled and severed, it is necessary to advance the connected rows of springs one step and at the same time bring another row of springs into proper position to be coupled on by the next pair of wire helicals. The mechanism for accomplishing this consists of what I term a stripping mechanism; that is, a mechanism for shifting the helicals and the spring coils which they connect out of their respective guide channels, and a transfer mechanism for then bodily shifting the assembly to one side a distance equal to the diameter of the upper and lower coils of the springs.

Describing the stripping mechanism, 32 designates each of a pair of horizontal rods that are mounted at one end in a bracket 33 (Fig. 2) mounted on the side frame members 10 and at the other end in rearwardly extending brackets 34 attached to the rear sides of the side frame members 10. These rods 32 constitute slideways for a pair of vertically disposed cross heads 35. In and between the lower ends of the cross heads 35 is journaled a rock shaft 36 that is square in cross section, and in and between the upper ends of said cross heads is journaled a similar rock shaft 36'. Referring to Figs. 6, 7, 8 and 13, pivoted in lugs 37 on the rear side of each rock bar is the downwardly bent shank 38' of a lifter finger 38 that extends across the rock bar and normally lies in the slot 20 of the jaw 16'. The free end portion of the finger 38 normally lies in and across a transverse groove 39 (Fig. 9) in the guide bar 18 and its tip is preferably formed as an upstanding hook 40. The finger is urged to a position in which it lies in contact with the top side of the rock shaft 36, or the bottom side of the rock shaft 36' and the bottom of the jaw groove 20 by a thrust spring 41 encircling a stud 42 that is mounted in the rear side of the rock bar and extends through a hole in the shank 38' of the finger, the spring 41 being footed on the head of the stud 42 and at its other end abutting against the finger shank. During the period when the wire helical H is being advanced to connect the coils of adjacent springs, the fingers 38 occupy their inner or idle position shown in Figs. 7 and 8. After the wire helical has been fed through the full length of the guide channel and severed, the rock shafts 36 and 36' are tilted to the position shown in Fig. 13, thus causing the fingers 38 to shift the wire helicals and the loops of springs connected thereby clear of the guide channels.

Figure 2:
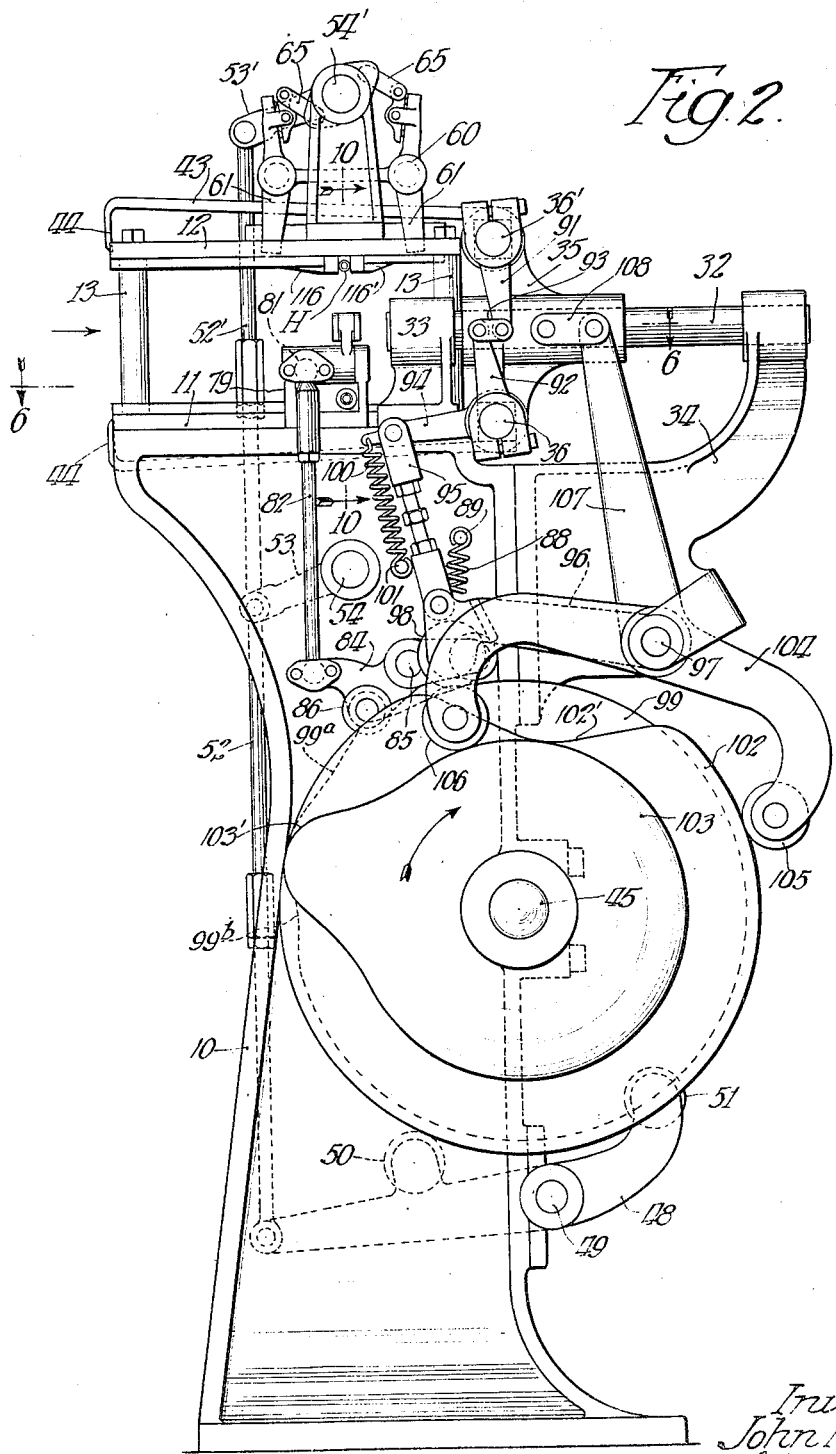
Fig. 2 is a side elevation, viewed from the right of Fig. 1.

Describing next the transfer mechanism, and referring to Figs. 2, 6 and 7, attached to the lower side of rock bar 36 and to the top side of rock bar 36' are long fingers 43 extending crosswise of the bottom and top plates 11 and 12 and terminating in inwardly bent tip portions or hooks 44 which normally overhang the front edge portions of the bottom and top plates 11 and 12, as shown in Figs. 2 and 7. The plates 11 and 12 and the guide strips 14 are formed with registering longitudinal slots 11a, 12a, and 14a (Fig. 7) to accommodate the in and out travel of the fingers 44. At the same time that the lifter fingers 38 are actuated to shift the wire helicals and the spring loops connected thereby clear of the guide grooves, the transfer fingers are rocked to a position wherein the hooks 44 will lie behind the end coils of the last row of springs that has been introduced to the machine. At this point the cross heads 35 are actuated rearwardly on the slide-ways 32, and thus the entire spring assembly is shifted one step rearwardly of the machine, in the direction indicated by the arrow in Fig. 7 to bring the tangent points of the upper and lower coils of the rearmost two rows of springs into register with the guide groove or channel of the wire helical connector next to be entered.

I have thus far described the various spring supporting, guiding and actuating mechanisms of the machine, and it now remains to describe the various actuating devices of said mechanisms. These actuating devices are all operated from a single power shaft 45 (Figs. 1 and 2) that is journaled in and extends between the side frame members 10, and from various properly synchronized cams on said shaft.

Describing first the mechanism for reciprocating the several sets of jaws 16, 16′, keyed on shaft 45 are a pair of cam discs 46 and 47, shown in detail in Fig. 16. The disc 46 is formed with a depressed peripheral cam surface 46′, and the disc 47 is formed with a protuberant peripheral cam surface 47′ of the same linear extent as the cam surface 46′; these cam surfaces being relatively positioned to effect a rocking movement in both directions of a lever 48 that is pivoted intermediate its ends on a stud 49 (Fig. 1) mounted in one of the frame members 10, and carries on opposite sides of its pivot cam followers 50 and 51, the former engaging the cam disc 46 and the latter the cam disc 47.

To one end of the lever 48 is pivoted the lower end of a link 52 that extends upwardly and is connected at its upper end to a crank arm 53 keyed on a transverse rock shaft 54 (Fig. 1) that is journaled in and between the frame members 10; the link 52 having incorporated therein a turn buckle 55 by which its exact length may be nicely adjusted. Journaled in standards 56 on the top plate 12 is a rock shaft 54′ corresponding functionally with the rock shaft 54; and on a projecting end of the rock shaft 54 is a crank arm 57 (Fig. 1) that is connected by a link 52′, similar to the link 52, to a crank arm 53′ on an overhanging end of the upper rock shaft 54′, so that, by the action of the cams 46′ and 47′ on the lever 48, the rock shafts 54 and 54′ are simultaneously rocked in the same direction. Referring to Fig. 7, keyed on the rock shaft 54 are a series of yokes 58 corresponding in number with the pairs of jaws 16 and 16′, and since the operating connections between these yokes and the jaws are identical, a description of one will suffice for all. Depending from the under side of the bottom plate 11 are brackets 59 (Fig. 1), each carrying a pair of laterally spaced studs 60 (Fig. 7) on which are journaled vertically disposed levers 61. The upper ends of these levers play through slots 62 in the bottom board 11 and at their upper ends carry rollers 63 which enter holes 64 in the jaws 16 and 16′. To the opposite ends of the yoke 58 are pivoted links 65, the outer ends of which are connected to the depending arms of the levers 61, preferably through the media of shoes 66 that are centrally pivoted at 67 in forked lugs 68 on the depending lever arms. In said lever arms are upper and lower adjusting screws 69 and 70 that abut against the faces of the shoes 66 on opposite sides of the pivots of the latter and thus provide for an accurate adjustment of the throw of the levers 61 from the yoke 58 and links 65. It is understood that a jaw actuating mechanism identical with that last described but inverted is provided between the upper rock shaft 54′ and the upper sliding jaws 16 and 16′ that underlie the top plate 12.

The mechanism for actuating the cover levers 23 to closing position simultaneously with the inward movement of the jaws and to open position simultaneously with the separating movement of the jaws, is best shown in Figs. 1 and 7 and comprises a group of arms 71 extending radially from collars 71′ secured to shaft 54 intermediate the yokes 58, and a similar group of arms 71 similarly located on the upper rock shaft 54′. Pivoted to each arm 71 is one end of a lengthwise adjustable rod 72, the other reduced end 72′ of which extends through a hole 73 in the outer end of the cover lever 23, so that when the shafts 54 and 54′ are rocked to move the jaws toward each other, the cover levers are simultaneously swung to bring their widened and flattened ends 23′ over the guide channel between the jaws, this closed position of the cover levers being shown in Fig. 12. A pull spring 74 anchored at one end to the lever 23 and at its other end to a lug 75 on the collar 71′, and continuously under tension, effects the opening movement of the cover levers simultaneously with the retracting movement of the jaws.

Describing next the cutter actuating mechanism by which the wire helicals, after having been threaded through the top and bottom coils of the springs, are severed, this mechanism is best illustrated in Figs. 1, 2, 10, 11 and 15, and since the mechanism is in duplicate on opposite sides of the machine, a description of one will suffice for both. The cutter bar 29 is connected at its outer end through a link 76 to an arm 77 fast on a rock shaft 78 journaled in a bearing bracket 79 mounted on the side frame member 10. Fast on the shaft 78 is an outwardly extending arm 80 that is coupled by a ball joint 81 (Fig. 10) to the upper end of a lengthwise adjustable vertical rod 82. Referring to Fig. 15, the lower end of the rod 82 is coupled by a ball joint 83 to one end of a lever 84 that is mounted on a pivot stud 85 on the side frame member 10. The forwardly extending arm of lever 84 carries a cam follower 86 that engages the periphery of a cam disc 87 keyed on the cam shaft 45, said disc being provided with a suitable timed protuberant cam 87′ that, through the mechanism last described, actuates the cutter bars on their working strokes. The cam follower 86 is caused to hug the periphery of the cam disc by a pull spring 88 that is connected at its lower end to the rearwardly extending arm of the lever 84 and at its upper end is anchored to a stud 89 projecting from the side frame member 10. The rearwardly extending arm of the lever 84 is preferably equipped with a cam follower 90 which is idle so long as the spring 88 is effective, but constitutes a safety feature to retract the cutter bar through the action of the cam 87′ in case the spring 88 should fail to function.

Describing next the stripper bar rocking mechanism, and referring to Figs. 1, 2 and 14, a depending arm 91 on one end of the rock shaft 36′ and an upstanding arm 92 on the rock shaft 36 are pivotally connected by a short link 93. Fast on the rock shaft 36 is a forwardly extending arm 94 to which is connected a depending lengthwise adjustable link 95, the lower end of which is pivoted to the forward end of an arm 96, said arm being pivoted at its rear end on a lateral stud 97 on the bracket 34. The free end of the arm 96 carries a cam follower 98 that rides on the periphery of a stripper cam disc 99 fast on the shaft 45. As seen in Fig. 14, the cam disc 99 has a protuberant cam 99′ for rocking the bars 36 and 36′ in a direction to actuate the stripper and transfer fingers to working position (Fig. 13). The intermediate portion of the cam 99′ is formed with a slight dip or depression 99ª, and just beyond the cam, with reference to its direction of rotation, is a similar slight dip or depression 99ᵇ, the purpose of said depressions being later explained. Cam follower 98 is caused to hug the periphery of the cam disc by means of a pull spring 100 anchored at its upper end to the tip of the arm 94 and at its lower end to a laterally projecting stud 101 on the frame member 10.

Immediately after the stripping mechanism has acted to move the wire helicals and the portions of the spring coils connected thereby out of the helical guide channels, (this operation at the same time shifting the transfer fingers 43 from idle to operative position), the cross heads 35 are retracted and then returned by a cam and lever mechanism which provides a positive action in both directions. As this cam and lever mechanism is duplicated at both sides of the machine, a description of one mechanism will suffice.

Keyed on the shaft 45 are a pair of cam discs 102 and 103. The disc 102 is formed with a depressed peripheral cam surface 102′ (Fig. 2), and the disc 103 is formed with a protuberant peripheral cam surface 103′ of the same linear extent as the cam surface 102′; these cam surfaces being relatively positioned to effect a rocking movement in both directions of a lever 104 that is pivoted intermediate its ends on the stud 97 (Fig. 2), and carries on opposite sides of its pivot cam followers 105 and 106, the former engaging the cam disc 102 and the latter the cam disc 103.

Fast on the hub of lever 104 is an arm 107 that extends upwardly and is connected by a link 108 to the cross head 35. By the means last described, the stripper fingers and transfer fingers, after they have been swung to working position by the stripping mechanism, are bodily moved rearwardly of the machine, carrying with them the stock operated upon, and are then lowered and returned to their former positions. During this transfer movement, the link 95 (Fig. 2) after it has been raised by the stripping cam 99′, undergoes a swinging movement on its lower pivot as a center, due to its connection to the sliding cross head 35. Since the upper end of the link 95 describes an arc during both the outward and return movements of the cross head and rocker bars, in order to give a straight line travel to the stripper and transfer fingers, the depressions 99ª and 99ᵇ in the stripper cam are provided, these depressions manifestly neutralizing the extra upward swing of arm 94 caused by the arcuate movement of the upper end of link 95.

Briefly describing the cycle of operations and their sequence in connection with the cam diagram, Fig. 17, let it be assumed that a pair of wire helicals have been fed by the coilers, or otherwise, through the machine, uniting the upper and lower coils of adjacent rows of springs. At the completion of this feeding movement, the cutter cams 87′ operate to sever and crimp the wire helicals. Simultaneously with the severing of the helicals, the jaw-actuating cams 46′, 47′ commence to retract the jaws 16, 16′, the jaws being fully opened by the time the helicals have been cut off. As soon as the jaws have been opened sufficiently to free the coils of the springs from the grooves of the jaws, the stripping cam 99′ begins to actuate the stripper and transfer fingers, withdrawing the helicals and connected portions of the spring coils from the guide channels, and as soon as these parts have been moved clear of the guide channels the transfer cams 102', 103' act to shift the connected rows of springs sidewise one step, and bring a new row of springs into position to be joined on by another wire helical.

In the machine herein illustrated, all of the above operations take place during one-third of a revolution of the cam shaft 45, the jaws having been returned to closed position at the end of a 120 degree turn of the shaft. While these operations have been taking place, the operation of the coilers has been interrupted; this being effected by the means shown in Figs. 3, 4 and 5, wherein a transmission shaft 109 of the coiling machine has splined thereon a peripherally grooved clutch member 110 that cooperates with a clutch member 111 on the hub of a transmission gear 112 through which the wire feed rolls of the coiler are driven.

The cam shaft 45 is extended beyond the sides of the assembling machine, and fast on one end thereof is a gear 113, by which the cam shaft may be driven from the main drive shaft 114 of the coiler C through a pinion 115 on the main drive shaft. The gear 113 carries on one face thereof an arcuate cam 116 of a length of 240 degrees. This cam cooperates with one end of a pivoted lever 117, the other end of which lever engages the groove of the clutch member 110. The clutch member 110 is normally held retracted by a pull spring 118. The parts are so timed that during the one-third revolution of the cam shaft 45 when the above described operations are being performed in the spring assembling machine, the cam follower on the lever 117 rides over the blank portion of the gear 113 between the ends of the cam 116. At the conclusion of these operations, the cam 116 throws in the clutch 110, 111, and holds it in during the remaining two-thirds revolution of the cam shaft, during which time the wire helicals are fed through the spring assembling machine. At the end of a complete revolution of the cam shaft, the cam 116 rides out of engagement with clutch shifting lever 117, the clutch is disconnected, the wire feed is arrested, and a new cycle of operations begins. It is economical to use two identical coiling machines C and C' reversely positioned relatively to the spring assembling machine, as shown in Fig. 3; and since the cam shaft 45 is not in the vertical plane of the wire helicals that are formed and fed by the two coiling machines, the spacing of the cam 116 which actuates the clutch of the coiler C' from its clutch, will be considerably greater than in the case of the coiler C. This may be taken care of by mounting the cam 116 of the coiler C' on a counter shaft 119 geared to and driven by the cam shaft 45, as indicated in Fig. 3.

I have found that to insure the threading of a wire helix around the contiguous portions of a pair of spring coils, the helix should preferably be guided on opposite sides thereof, by correspondingly grooved guide members; and since, when this is done, the helix must be subsequently displaced laterally from such guide members, it is essential to make the latter bodily shiftable toward and from the path of travel of the helix. In the present machine these laterally shiftable guide members are represented by the reciprocating jaws 16, 16'.

While I have herein shown, and contemplate using, a wire coiling machine so associated with the spring assembling machine as to function also as a wire helical feed for the latter, it should be understood that an individual feeding mechanism handling previously formed helicals may be substituted where and when desired.

It is manifest that many of the structural details of the machine herein illustrated and described may be widely varied within the spirit and purview of the present invention. Hence, believing myself the first to provide a machine wherein the coil springs are properly positioned and held, and a wire helical is mechanically applied to contiguous end coils of the springs, to tie the latter together, I do not limit the invention to the particular mechanism shown, except to the extent clearly indicated in specific claims.

I claim:

1. Spring assembling mechanism of the character described, comprising in combination means for supporting two parallel rows of coil springs with corresponding end coils of the two rows disposed adjacent to each other, means for feeding a wire helix endwise between said end coils and simultaneously rotating said helix on its axis, and spiral means for guiding said helix so as to cause the coils thereof to be wrapped around laterally adjacent portions of said spring coils.

2. Spring assembling mechanism of the character described, comprising in combination means for holding two parallel rows of coil springs with corresponding end coils of the two rows disposed adjacent to each other, a guide channel extending between said end coils formed with spirially grooved walls, and means for feeding a wire helix through said guide channel in engagement with said grooved walls, whereby to cause said helix to encircle and tie together adjacent portions of said coils.

3. Spring assembling mechanism of the character described, comprising in combination means for supporting two parallel rows of coil springs with corresponding end coils of two rows disposed adjacent to each other, means for feeding a wire helix endwise between said end coils and simultaneously rotating said helix on its axis, means for guiding said helix so as to cause the coils thereof to be wrapped around adjacent portions of said spring coils, and means for displacing said helix from said guiding means.

4. Spring assembling mechanism of the character described, comprising in combination means for supporting parallel rows of coil springs with corresponding end coils of two rows lying adjacent to each other, means for feeding a wire helix endwise between said end coils and simultaneously rotating said helix on its axis, means for guiding said helix so as to cause the coils thereof to be wrapped around adjacent portions of said spring coils, means for displacing said helix from said guiding means, and means for shifting said rows of springs laterally of said guiding means whereby to bring a new row into register with said guiding means.

5. Spring assembling mechanism of the character described, comprising in combination means for holding two parallel rows of coil springs with corresponding end coils of the two rows disposed adjacent to each other, a guide channel extending between said end coils, the bottom wall of said channel being spirally grooved, and means for feeding a wire helix through said guide channel with the coils thereof guided by said grooved bottom wall and simultaneously rotating said helix on its axis, whereby to cause said helix to encircle and tie together adjacent portions of said coils.

6. Spring assembling mechanism of the character described, comprising in combination means for holding two parallel rows of coil springs with corresponding end coils of the two rows disposed adjacent to each other, a guide channel extending between said end coils, opposed sections of the side walls of said channel being spirally grooved and movable toward and from each other, means for feeding a wire helix through said guide channel with the coils thereof guided by said grooved sections and simultaneously rotating said helix on its axis, and means for shifting said grooved wall sections out of engagement with said helix to permit the removal of the latter from said guide channel.

7. Spring assembling mechanism of the character described, comprising in combination means for holding two parallel rows of coil springs with corresponding end coils of the two rows lying adjacent to each other, a guide channel extending between said end coils, opposed sections of the side walls of said channel occupied by contiguous end coils being spirally grooved and movable toward and from each other and alternating sections of said side walls being fixed, means for feeding a wire helix through said guide channel with the coils thereof guided by said grooved sections and simultaneously rotating said helix on its axis, and means for shifting said grooved wall sections out of engagement with said helix to permit the removal of the latter from said guide channel.

8. Spring assembling mechanism of the character described, comprising in combination means for holding two parallel rows of coil springs with corresponding end coils of the two rows lying adjacent to each other, a guide channel extending between said end coils, means for feeding a wire helix through said guide channel and simultaneously rotating said helix on its axis to thereby wrap the same around laterally adjacent end coils, a removable cover member for said channel, and means for withdrawing said cover member to permit removal of said helix from said guide channel.

9. Spring assembling mechanism of the character described, comprising in combination means for holding two parallel rows of coil springs with corresponding end coils of the two rows lying adjacent to each other, a guide channel extending between said end coils, means for feeding a wire helix through said guide channel and simultaneously rotating said helix on its axis to thereby wrap the same around laterally adjacent end coils, a hinged cover member for said channel, and means for swinging said cover member to and from channel closing position.

10. In a machine for assembling and connecting parallel rows of coil springs, the combination of a frame structure, spaced bed and top plates mounted on said frame structure, means on the opposed faces of said plates for guiding the end coils of rows of springs inserted between said plates, guide channels extending crosswise of said spring guiding means adapted to receive adjacent portions of the end coils of adjacent rows, means for feeding wire helicals endwise through said channels and simultaneously rotating said helicals on their axes, and means associated with said channels for guiding the coils of said helicals around the adjacent portions of said end coils.

11. In a machine for assembling and connecting parallel rows of coil springs, the combination of a frame structure, spaced bed and top plates mounted on said frame structure, means on the opposed faces of said plates for guiding the end coils of rows of springs inserted between said plates, guide channels extending crosswise of said spring guiding means adapted to receive adjacent portions of the end coils of adjacent rows, means for feeding wire helicals endwise through said channels and simultaneously rotating said helicals on their axes, means associated with said channels for guiding the coils of said helicals around the adjacent portions of said end coils, and means for displacing said helicals and the portions of said end coils connected thereby from said channels.

12. In a machine for assembling and connecting parallel rows of coil springs, the combination of a frame structure, spaced bed and top plates mounted on said frame structure, means on the opposed faces of said plates for guiding the end coils of rows of springs inserted between said plates, guide channels extending crosswise of said spring guiding means adapted to receive adjacent portions of the end coils of adjacent rows, means for feeding wire helicals endwise through said channels and simultaneously rotating said helicals on their axes, means associated with said channels for guiding the coils of said helicals around the adjacent portions of said end coils, means for displacing said helicals and the portions of said end coils connected thereby from said channels, and means for shifting the connected rows of springs laterally of said channel.

13. In a machine for assembling and connecting parallel rows of coil springs, the combination of a frame structure, spaced bed and top plates mounted on said frame structure, means on the opposed faces of said plates for guiding the end coils of rows of springs inserted between said plates, guide channels extending crosswise of said spring guiding means adapted to receive adjacent portions of the end coils of adjacent rows, means for feeding wire helicals endwise through said channels and simultaneously rotating said helicals on their axes, means associated with said channels for guiding the coils of said helicals around the adjacent portions of said end coils, means for displacing said helicals and the portions of said end coils connected thereby from said channels, means for shifting the connected rows of springs laterally of said channel, and means for advancing another row of springs to said guide channels for connection in the same manner to one of said previously connected rows of springs.

14. In a machine for assembling and connecting parallel rows of coil springs, the combination of a frame structure, spaced bed and top plates mounted on said frame structure, means on the opposed surfaces of said plates for guiding the end coils of rows of springs inserted between said plates, opposed jaws slidably mounted on the upper face of said bed plate and on the under face of said top plate, the inner faces of said jaws being spirally grooved and forming, in the inner position of said jaws, guide channels adapted to be entered by adjacent portions of the end coils of adjacent rows of springs, means for feeding wire helicals endwise through said channels and simultaneously rotating said helicals on their axes, and means for separating said jaws to release said helicals.

15. In a machine for assembling and connecting parallel rows of coil springs, the combination of a frame structure, spaced bed and top plates mounted on said frame structure, means on the opposed surfaces of said plates for guiding the end coils of rows of springs inserted between said plates, opposed jaws slidably mounted on the upper face of said bed plate and on the under face of said top plate, the inner faces of said jaws being spirally grooved and forming, in the inner position of said jaws, guide channels adapted to be entered by adjacent portions of the end coils of adjacent rows of springs, spirally grooved strips forming the bottom walls of said guide channels, means for feeding wire helicals endwise through said channels and simultaneously rotating said helicals on their axes, and means for separating said jaws to release said helicals.

16. In a machine for assembling and connecting parallel rows of coil springs, the combination of a frame structure, spaced bed and top plates mounted on said frame structure, means on the opposed surfaces of said plates for guiding the end coils of rows of springs inserted between said plates, opposed jaws slidably mounted on the upper face of said bed plate and on the under face of said top plate, the inner faces of said jaws being spirally grooved and forming, in the inner position of said jaws, guide channels adapted to be entered by adjacent portions of the end coils of adjacent rows of springs, strippers associated with said channels, means for feeding wire helicals endwise through said channels and simultaneously rotating said helicals on their axes, means for separating said jaws to release said helicals, and means for actuating said strippers after said jaws have been withdrawn from engagement with said helicals.

17. In a machine for assembling and connecting parallel rows of coil springs, the combination of a frame structure, spaced bed and top plates mounted on said frame structure, means on the opposed surfaces of said plates for guiding the end coils of rows of springs inserted between said plates, opposed jaws slidably mounted on the upper face of said bed plate and on the under face of said top plate, the inner faces of said jaws being spirally grooved and forming, in the inner position of said jaws, guide channels adapted to be entered by adjacent portions of the end coils of adjacent rows of springs, strippers associated with said channels, transfer devices, means for feeding wire helicals endwise through said channels and simultaneously rotating said helicals on their axes, means for separating said jaws to release said helicals, means serving to actuate said strippers after said jaws have been withdrawn from engagement with said helicals and to simultaneously move said transfer devices into engagement with an additional row of springs, and means for effecting travel of said strippers and transfer devices laterally of said channels to bring said additional row of springs into position to be connected onto one of the said previously connected rows.

18. In a machine for assembling and connecting parallel rows of coil springs, the combination of a frame structure, spaced bed and top plates mounted on said frame structure, means on the opposed surfaces of said plates for guiding the end coils of rows of springs inserted between said plates, guide channels on the opposed surfaces of said plates extending crosswise of said coil guiding means and adapted to be entered by adjacent portions of the end coils of adjacent rows of springs, cross-heads slidably mounted on said frame structure, upper and lower rock shafts journaled in and between said cross-heads, stripper fingers mounted on said rock shafts extending across the bottoms of said channels, means for feeding wire helicals endwise through said channels and simultaneously rotating said helicals on their axes, means for tilting said rock shafts to thereby cause said stripper fingers to dislodge said helicals from said guide channels, and means for imparting a reciprocating movement to said cross-heads.

19. In a machine for assembling and connecting parallel rows of coil springs, the combination of a frame structure, spaced bed and top plates mounted on said frame structure, means on the opposed surfaces of said plates for guiding the end coils of rows of springs inserted between said plates, guide channels on the opposed surfaces of said plates extending crosswise of said coil guiding means and adapted to be entered by adjacent portions of the end coils of adjacent rows of springs, cross-heads slidably mounted on said frame structure, upper and lower rock shafts journaled in and between said cross-heads, stripper fingers mounted on said rock shafts extending across the bottoms of said channels, transfer fingers mounted on said rock shafts extending across said bed and top plates, means for feeding wire helicals endwise through said channels and simultaneously rotating said helicals on their axes, means for tilting said rock shafts to thereby cause said stripper fingers to dislodge said helicals from said guide channels and said transfer fingers to move into engagement with an additional row of springs, and means for imparting a reciprocating movement to said cross-heads.

20. Spring assembling mechanism of the character described, comprising in combination means for clamping two parallel rows of coil springs with corresponding end coils of the two rows disposed adjacent to each other, wire coiling machines disposed respectively adjacent to opposite sides of said spring clamping means, means for guiding the wire helicals delivered by said coiling machines between the respective end coils of said rows of springs and causing the same to encircle and tie together adjacent portions of said end coils, and means for severing said helicals.

21. In combination with means for supporting parallel adjacent rows of coil springs, means for guiding a wire helix between said rows and around adjacent portions of end coils of said springs, means for severing said helix, and means for transferring the connected rows laterally, a wire coiling machine functioning to form and feed said helix between said rows, and means operating to automatically idle the operation of said coiling machine during the operations of said severing and transferring means.

22. In combination with means for supporting parallel adjacent rows of coil springs, means for guiding a wire helix between said rolls and around adjacent portions of end coils of said springs, means for severing said helix, and means for transferring the connected rows laterally, a wire coiling machine functioning to form and feed said helix between said rows, and means operating to automatically idle the operation of said coiling machine during the operations of said severing and transferring means and to restore the operation of said coiling machine at the conclusion of the operation of said transferring means.

23. In combination with means for supporting parallel adjacent rows of coil springs, means for guiding a wire helix between said rows and around adjacent portions of end coils of said springs, means for severing said helix, and means for transferring the connected rows laterally, a wire coiling machine functioning to form and feed said helix between said rows, a clutch in said coiling machine controlling the operation thereof, and cam-controlled means synchronized with said severing and transferring means serving to idle the operation of said coiling machine during the operations of said severing and transferring means and to restore the operation of said coiling machine at the conclusion of the operation of said transferring means.

24. Spring assembling mechanism of the character described comprising in combination means for supporting a row of coil springs, a guide channel disposed substantially tangential to end coils of said row and adapted to register with portions of said end coils, said channel having spirally grooved walls, and means for feeding a wire helix through said guide channel in engagement with the grooves of said walls, whereby said helix is caused to encircle and connect the portions of said end coils in register with said channel.

25. Spring assembling mechanism of the character described, comprising in combination means for supporting a row of coil springs, a guide channel disposed substantially tangential to end coils of said row and adapted to receive portions of said end coils, said channel having opposed spirally grooved walls, and means for feeding a wire helix through said guide channel in engagement with the grooves of said walls, whereby said helix is caused to encircle and connect the portions of said end coils lying within said channel.

26. Spring assembling mechanism of the character described, comprising in combination means for supporting a row of coil springs, a guide channel disposed substantially tangential to end coils of said row and adapted to receive portions of said end coils, said channel having opposed spirally grooved walls movable into and out of operative position, and means for feeding a wire helix through said guide channel in engagement with the grooves of said walls.

27. Spring assembling mechanism of the character described, comprising in combination means for supporting a row of coil springs, a guide channel disposed substantially tangential to end coils of said row and adapted to receive portions of said end coils, said channel having opposed movable spirally grooved walls, means for feeding a wire helix through said guide channel in engagement with the grooves of said walls, and mechanism for simultaneously moving said walls into position to receive and guide said helix and for simultaneously moving said walls away from each other to release said helix.

JOHN F. GAIL.